(12) United States Patent
Duffy et al.

(10) Patent No.: US 11,503,049 B2
(45) Date of Patent: Nov. 15, 2022

(54) METHOD AND APPARATUS FOR COMPROMISED IOT DEVICE DETECTION

(71) Applicant: Nokia Technologies Oy, Espoo (FI)

(72) Inventors: David Duffy, Cambridge (GB); Matthew Lawrenson, Chesterfield, MO (US); Harm Cronie, Echallens (CH)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 17/030,110

(22) Filed: Sep. 23, 2020

(65) Prior Publication Data
US 2021/0099471 A1    Apr. 1, 2021

(30) Foreign Application Priority Data

Sep. 26, 2019   (EP) .................................... 19199813

(51) Int. Cl.
*G01W 1/02*     (2006.01)
*H04L 9/40*     (2022.01)
*G16Y 30/10*    (2020.01)
*G16Y 10/75*    (2020.01)
*H04L 43/08*    (2022.01)
*G05D 1/02*     (2020.01)

(52) U.S. Cl.
CPC .......... *H04L 63/1416* (2013.01); *G16Y 10/75* (2020.01); *G16Y 30/10* (2020.01); *H04L 43/08* (2013.01); *H04L 63/1425* (2013.01)

(58) Field of Classification Search
USPC ....................................................... 726/23
See application file for complete search history.

(56) References Cited

U.S. PATENT DOCUMENTS

| | | | |
|---|---|---|---|
| 9,749,342 B1 | 8/2017 | Krage et al. | |
| 9,762,596 B2 | 9/2017 | Wang et al. | |
| 10,354,534 B1* | 7/2019 | Sanchez | G08G 1/20 |
| 2016/0219066 A1 | 7/2016 | Vasseur et al. | |
| 2016/0261465 A1 | 9/2016 | Gupta et al. | |
| 2018/0302440 A1 | 10/2018 | Hu et al. | |
| 2019/0098028 A1 | 3/2019 | Ektare et al. | |

(Continued)

OTHER PUBLICATIONS

Mieidan et al., "Detection of Unauthorized IoT Devices Using Machine Learning Techniques", arXiv, Sep. 14, 2017, 13 pages.

(Continued)

*Primary Examiner* — Jude Jean Gilles
(74) *Attorney, Agent, or Firm* — Nokia Technologies Oy (57) ABSTRACT

A method and apparatus for determining one or more first devices that are Internet devices meeting all of the following conditions: residing at a given location; equipped with one or more ambience sensing capable sensors; and operation mode being such that their ambience sensing capable sensors should not cause transmission of data. One or more second devices are determined that are Internet devices at the given location and equipped with one or more elements capable of causing an ambient stimulation detectable by the sensors of one or more first devices. Data transmissions of the first devices are monitored. Issuing of the ambient stimulation is caused by a subset of the one or more second devices. It is determined whether the issuing of the ambient stimulation caused a significant change in the monitored data transmissions of the first devices.

20 Claims, 6 Drawing Sheets

(56) References Cited

U.S. PATENT DOCUMENTS

2020/0028945 A1* 1/2020 Allen .................... H04L 67/61
2020/0177994 A1* 6/2020 Davis .................... H04R 3/005

OTHER PUBLICATIONS

Miettinen et al., "IoT Sentinel: Automated Device-type Identification for Security Enforcement in IoT" arXiv, Dec. 13, 2016, 11 pages.

Pineda, "Rogue Device Detector for Local Area Networks", The Asian Pacific Chronicle, vol. 7, No. 2, Apr. 2014, pp. 18-23.

"Game of Drones—Detecting Streamed POI from Encrypted FPV Channel", YouTube, Retrieved on Sep. 18, 2020, Webpage available at: https://www.youtube.com/watch?v=4icQwducz68.

Nassi et al., "Game of Drones—Detecting Streamed POI from Encrypted FPV Channel", arXiv, Jan. 9, 2018, pp. 1-11.

Genkin et al., "Acoustic Cryptanalysis", Journal of Cryptology, vol. 30, 2017, pp. 392-443.

Genkin et al., "RSA Key Extraction via Low-Bandwidth Acoustic Cryptanalysis", Acoustic, Dec. 18, 2013, pp. 1-57.

"Amazon Intros a New Echo Show with Built-in Smart Home Hub", Tech Crunch, Retrieved on Sep. 18, 2020, Webpage available at: https://techcrunch.com/2018/09/20/amazon-intros-a-new-echo-show-with-built-in-smart-home-hub/.

"Over Nine Million Cameras and DVRs Open to APTs, Botnet Herders, and Voyeurs", ZD Net, Retrieved on Sep. 18, 2020, Webpage available at: https://www.zdnet.com/article/over-nine-million-cameras-and-dvrs-open-to-apts-botnet-herders-and-voyeurs/.

"The Reaper IoT Botnet Has Already Infected a Million Networks", Wired, Retrieved on Sep. 18, 2020, Webpage available at : https://www.wired.com/story/reaper-iot-botnet-infected-million-networks/.

"The Truth is, Most IoT Devices can be Turned into Botnets", Silicon Republic, Retrieved on Sep. 18, 2020, Webpage available at : https://www.siliconrepublic.com/machines/iot-devices-botnets-autonomous-cars.

Apthorpe et al., "Spying on the Smart Home: Privacy Attacks and Defenses on Encrypted IoT Traffic", arXiv, Aug. 16, 2017, pp. 1-16.

Simpson et al., "Securing Vulnerable Home IoT Devices with an in-hub Security Manager", IEEE International Conference on Pervasive Computing and Communications Workshops (PerCom Workshops), 2017, pp. 1-6.

Extended European Search Report received for corresponding European Patent Application No. 19199813.7, dated Nov. 29, 2019, 7 pages.

Siboni et al., "Advanced Security Testbed Framework for Wearable IoT Devices", ACM Transactions on Internet Technology, vol. 16, No. 4, Dec. 2016, pp. 26.1-26.25.

* cited by examiner

METHOD AND APPARATUS FOR COMPROMISED IOT DEVICE DETECTION

TECHNICAL FIELD

Various example embodiments relate to detecting compromised Internet devices. In particular, though not exclusively, various example embodiments relate to detecting compromised Internet of Things devices.

BACKGROUND

This section illustrates useful background information without admission of any technique described herein representative of the state of the art.

Internet connectivity spreads to numerous devices. Internet of Things (IoT) devices communicate with other devices in the Internet of their own initiative. The IoT devices may be configured to autonomously transmit measurement data and/or to control some physical devices, such as actuators, based on received data. The IoT devices communicate over the Internet.

As IoT devices become ubiquitous and as they are typically continuously connected to the Internet, the IoT devices may form a security threat if compromised by an Internet attack. Compromised IoT devices may spy their environment and send recorded sound, video or measurement data to anyone in the Internet. It might be possible to detect some compromised IoT devices from a change in their traffic, although there are numerous different IoT devices for differing purposes. Moreover, there are natural changes, even large fluctuations, in the normal traffic of IoT devices. Hence, it is at least difficult to detect all compromised IoT devices with such methods monitoring changes in the traffic. There are also numerous techniques to protect IoT devices against compromising including ensuring that appropriate security updates are made. Some of these techniques may also attempt to detect any unauthorized changes in the software of the IoT devices. Such techniques are yet operable only as long as the guarding software instances in the IoT devices remain unaltered.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first example aspect of the present invention, there is provided a method comprising:

determining one or more first devices that are Internet devices meeting all of the following conditions: residing at a given location; equipped with one or more ambience sensing capable sensors; and operation mode being such that their ambience sensing capable sensors should not cause transmission of data;

determining one or more second devices that are Internet devices at the given location and equipped with one or more elements capable of causing an ambient stimulation detectable by the sensors of one or more first devices;

monitoring data transmissions of the first devices;

causing issuing of the ambient stimulation by a subset of the one or more second devices; and determining whether the issuing of the ambient stimulation caused a significant change in the monitored data transmissions of the first devices.

The method may further comprise maintaining capability and status information of one or more Internet devices, the status information comprising location and current operation mode.

The method may further comprise performing the determining of the one or more first devices based on the capability and status information. Alternatively or additionally, the method may further comprise performing the determining of the one or more first devices based on a device discovery.

The method may further comprise performing the determining of the one or more second devices based on the capability and status information. Alternatively or additionally, the method may further comprise performing the determining of the one or more second devices based on a device discovery.

The device discovery may comprise discovering devices meeting set criteria. The device discovery may comprise sending one or more messages to a plurality of Internet devices that potentially include some first and second devices. Alternatively or additionally, the device discovery may comprise querying capability and/or status information from one or more network entities. The one or more network entities may be other than a network entity that performs the method of the first example aspect. The network entities may comprise one or more entities selected from a group consisting of: a server; a virtual server; a cloud computing function; a distributed server.

The monitoring of the data transmissions of the first devices may be performed continually. Alternatively, the monitoring of the data transmission of the first devices may be performed at given periods of time. Said periods of time may be selected based on random timing. Said periods of time may be selected based on the status of the first devices. Said periods of time may be selected based on the status of the second devices. Said periods of time may be selected with attempt to avoid interfering normal use of the first devices. Said periods of time may be selected with attempt to avoid interfering normal use of the second devices. The method may comprise indicating to a user when the second devices issue the ambient stimulation. The method may comprise allowing a user to determine one or more periods of time when the second devices issue the ambient stimulation.

The method may be performed in a private network. The method may be performed by a control entity. The control entity may comprise a router. The control entity may comprise a firewall. The first devices may be connected to the Internet from the private network. The second devices may be connected to the Internet from the private network.

The ambient stimulation may be or comprise an audio signal. The audio signal may comprise a portion of an audible frequency. The audio signal may comprise a portion with a frequency in a non-audible frequency. The audible frequency may be at least 20 or 30 Hz. The audible frequency may be at most 15 kHz; 16 kHz; 18 kHz; or 20 kHz.

The ambient stimulation may be or comprise a light signal. The light signal may comprise a portion of a visible frequency. The light signal may comprise a portion with a frequency in a non-visible frequency. The visible frequency may be at least 400 THz; 430 THz; or 460 THz. The visible frequency may be at most 750 THz; 770 THz; or 800 THz.

The ambient stimulation may be or comprise a vibration signal. The vibration signal may be a haptic signal.

The ambient stimulation may be or comprise movement of an object detectable by movement detection, e.g., ultrasound based sonar sensors; 3D camera sensors; LIDAR sensors.

The ambient stimulation may be or comprise an electromagnetic signal. The electromagnetic signal may be a radio communication signal, e.g., a Bluetooth; wireless LAN; or a wireless USB signal.

The ambient stimulation may be detectable by the first devices at a range at least 1 m; 2 m; 5 m; 10 m; or 20 m.

The ambient stimulation may be issued by causing an increase or decrease in one or more ambient properties detectable by the one or more first devices. The ambient stimulation may comprise a series of changes. In one or more ambient properties detectable by the one or more first devices. The ambient stimulation may comprise a transmission with a combination of power and frequency distribution that is safe to human beings at a distance of at least 1 cm; 10 cm; or 1 m from each of the second devices. The ambient stimulation may comprise reducing one or more ambient properties detectable by the first devices. The ambient stimulation may comprise switching off a sound source. The ambient stimulation may comprise switching off a light source. The ambient stimulation may comprise switching off a vibration source.

The method may further comprise determining the significant change based on an estimated physical relationship between the first devices to the stimulation. The estimated physical relationship between may be determined using a distance between the first and second devices. The distance between the first and second devices may be determined based on positions indicated by the first and second devices in question. Alternatively or additionally, the distance of at least some first and second devices may be provided by a user.

The method may further comprise controlling the first devices to use their sensors to measure ambient signals and signal in a predetermined manner with the second signal to controllably perform the estimating of the physical relationship between the sensors of the first devices.

The sensors of the first device may comprise one or more sound sensors. The sensors of the first device may comprise one or more light sensors. The sensors of the first device may comprise one or more image sensors. The sensors of the first device may comprise one or more vibration sensors. The sensors of the first device may comprise one or more motion sensors. One first device may comprise a plurality of sensors of same and/or different types.

The determining of the significant change in the monitored data transmissions may be based on changes in data rate. The determining of the significant change in the monitored data transmissions may be based on changes in recipients. The determining of the significant change in the monitored data transmissions may be based on changes in communication protocols, such as transport protocols, streaming protocols and/or Quality of Service.

The determining of the one or more first devices may be based on past activity of the Internet devices.

According to a second example aspect of the present invention, there is provided an apparatus comprising:

a communication interface for transferring data with other devices; and at least one processor configured to perform:

determining one or more first devices that are Internet devices meeting all of the following conditions: residing at a given location; equipped with one or more ambience sensing capable sensors; and operation mode being such that their ambience sensing capable sensors should not cause transmission of data;

determining one or more second devices that are Internet devices at the given location and equipped with one or more elements capable of causing an ambient stimulation detectable by the sensors of one or more first devices;

monitoring data transmissions of the first devices using the communication interface;

causing issuing of the ambient stimulation by a subset of the one or more second devices, using the communication interface; and determining whether the issuing of the ambient stimulation caused a significant change in the monitored data transmissions of the first devices.

According to a third example aspect of the present invention, there is provided a computer program comprising computer executable program code configured to execute method of the first example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fourth example aspect of the present invention, there is provided an apparatus comprising a memory and a processor that are configured to cause the apparatus to perform the method of the first example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4d of the drawings. In this document, like reference signs denote like parts or steps.

Figure 1:
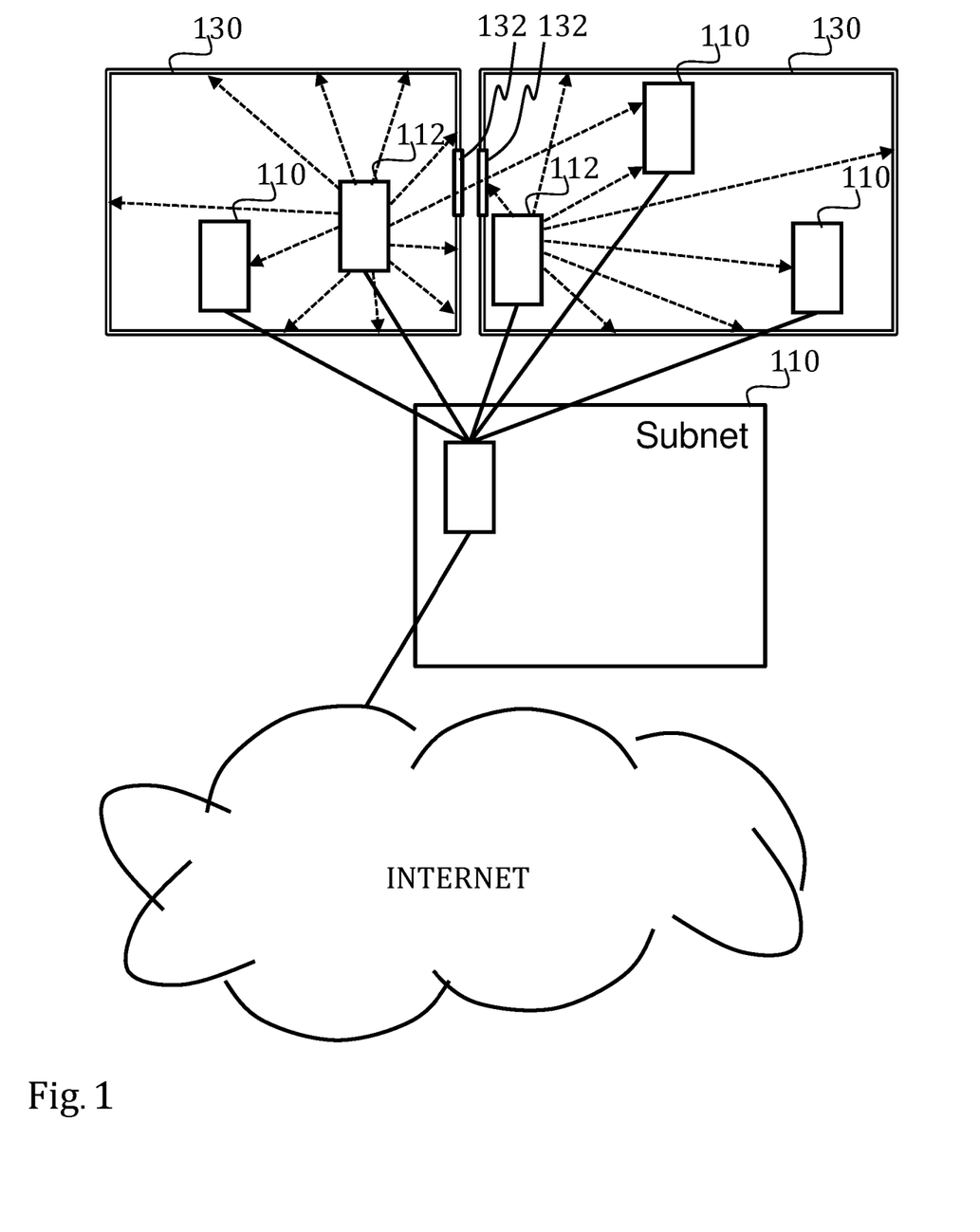
FIG. 1 shows an architectural drawing of a system of an example embodiment.

FIG. 1 shows an architectural drawing of a system of an example embodiment. FIG. 1 shows some local environment such as an office or home environment with various first devices 110 or network devices, second devices 112 (possibly identical to first devices but just used in another role as will become apparent in the following), one or more second devices 120 for monitoring the operation of the first devices 110, and a schematic drawing of some walls 130 and other space limiting structures. The first devices 110, the second devices 112 and the third devices 120 are connected to a local subnet 140 that provides access to the Internet 150. The local subnet may comprise one or more continuous or disjoint network address spaces. The network address space of one example embodiment is such as 192.168.0.0 . . . 192.168.0.255 and 192.168.4.40 . . . 192.168.4.200 (417 addresses), or 192.168.x.y, wherein x is 0 to 20 and y is 0 to 255 (5376 addresses), or 192.168.a.b and 10.c.d.e and 172.16.f.g, wherein parameters a to g are freely selected between 0 and 255.

The space limiting structures have varying extent of suppressing propagation of different ambient signals. For example, thick stone walls may effectively block both light and sound, whereas low office cubicle walls may only partly block light and have little or no blocking impact on sound propagation.

In an embodiment, the first devices 110 and the second devices 112 are various Internet employing devices such as Internet enabled fridges; television sets; gaming devices; person scales; cleaning robots; assisting robots; computers; electric books; vacuum cleaners; burglar alarm devices; liquid leak monitors; gas leak monitors; temperature sensors or water meters. The first devices 110 and the second devices 112 may be Internet of Things (IoT) devices i.e. devices that meet the following definition: Interrelated physical things each having a unique identifier and capability of transferring data over a network without need of human-to-human or human-to-computer interaction. The second devices 120 can also comprise one or more first devices 110 and/or second devices 112. In an embodiment, the second device 120 is combined with a local network device that supervises network traffic in the local subnet 140. The local network device is or comprises, for example, any one or more of the following: a firewall; a router; a network analyzer.

FIG. 1 shows two schematic rooms each with one window 132 and otherwise continuous walls 130 closed by doors (not shown). Dashed lines illustrate imaginary propagation of ambient stimulation, such as audio and light signals. From the left hand side room, the ambient stimulation passes through the windows 130, as would be the case with light signals. From the right-hand side room, the ambient stimulation is blocked by the window 132 of respective room, as would be the case with an audio signal and well sound proofed windows. This exemplifies that how different types of signals may pass or be hindered by different types of structures. Notably, some structures do not absolutely stop a signal: a sound may just attenuate below a level detectable by some sensors, as well as the light may be dimmed enough to no longer be detectable.

Figure 2:
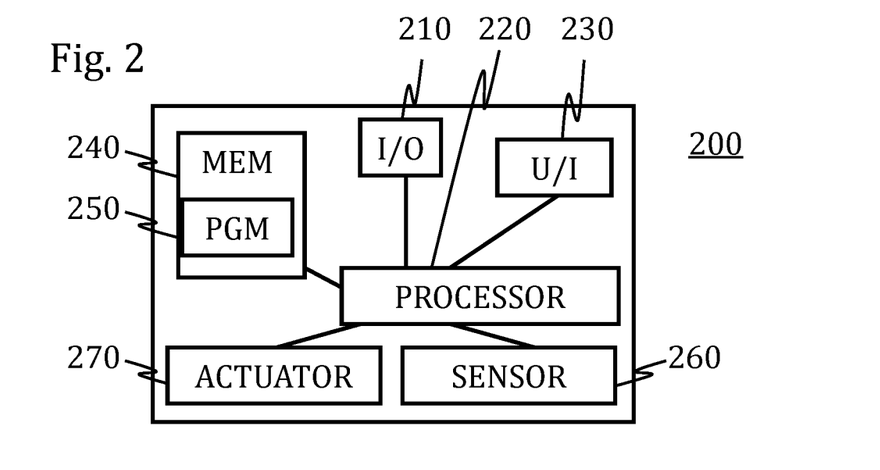
FIG. 2 shows a block diagram of a first device of an example embodiment.

FIG. 2 shows a block diagram of a first device 110 according to an embodiment of the invention. The first device 110 comprises a user interface for user interfacing and a memory 240 including a persistent computer program code 250. The first device 110 further comprises a processor 220 for controlling the operation of the first device 110 using the computer program code 240 and a communication unit 210 for communicating with network data packets. The communication unit 210 comprises, for example, a local area network (LAN) port; a wireless local area network (WLAN) unit; Bluetooth unit; cellular data communication unit; or satellite data communication unit. The processor 220 comprises, for example, any one or more of: a master control unit (MCU); a microprocessor; a digital signal processor (DSP); an application specific integrated circuit (ASIC); a field programmable gate array; and a microcontroller.

The first device 110 further comprises one or more sensors 260 capable of measuring physical properties such as any one or more of the following properties: sound; light; movement; pressure; air composition; location sensor such as satellite based location sensor; WLAN based location sensor; radio frequency identity (RFID) based location sensor; a location tag sensor for reading proximate radio frequency or visual location tag.

The first device 110 further comprises in an embodiment one or more elements 270 capable of causing emission of one or more ambient signals. Such elements 270 comprise, for example, any one or more of the following items: a motor; a valve; a loudspeaker; a vibrator.

In an example embodiment, the second device 112 has the structure of the first device 110. However, while the first devices 110 need not have the actuators 270 capable of causing emission of ambient signals, the second devices 112 are capable of causing ambient signals. On the other hand, the second devices 112 need not have a capability of sensing ambient signals so the second devices 112 may lack the sensors 260.

Examples of equipment enabling the second devices to cause ambient signals include at least one of the following:
  network controllable washing machine;
  network controllable dish washer;
  network controllable coffee maker;
  network controllable speakers;
  network controllable alarm system;
  network controllable cleaning robot;
  network controllable printer;
  network controllable air conditioning;
  network controllable blinds;
  network controllable illumination.

Figure 3:
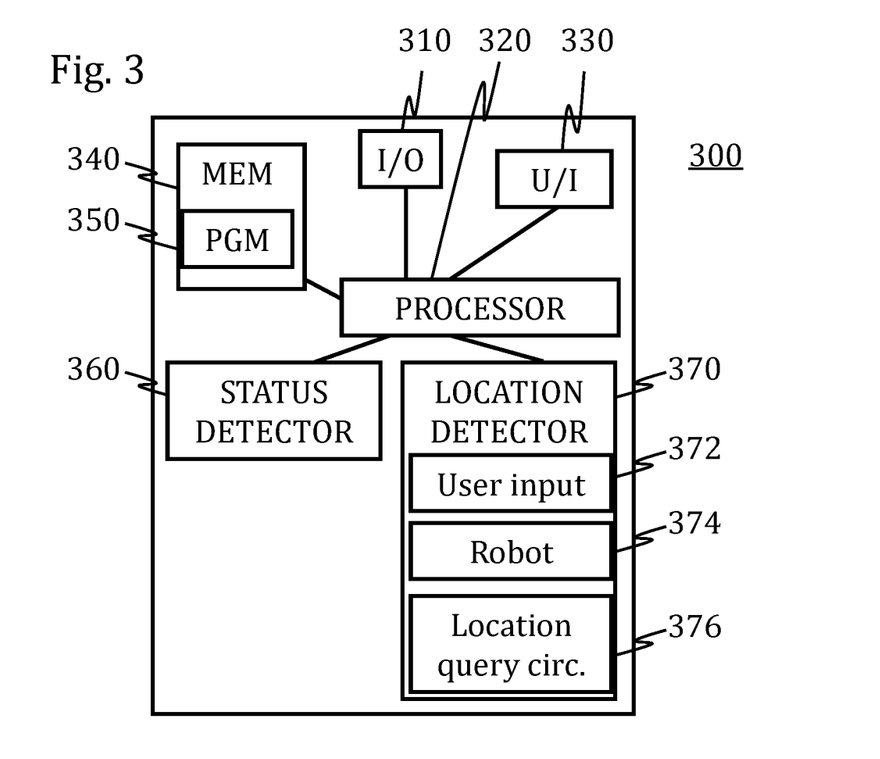
FIG. 3 shows a block diagram of a second device of an example embodiment.
Figure 4A:
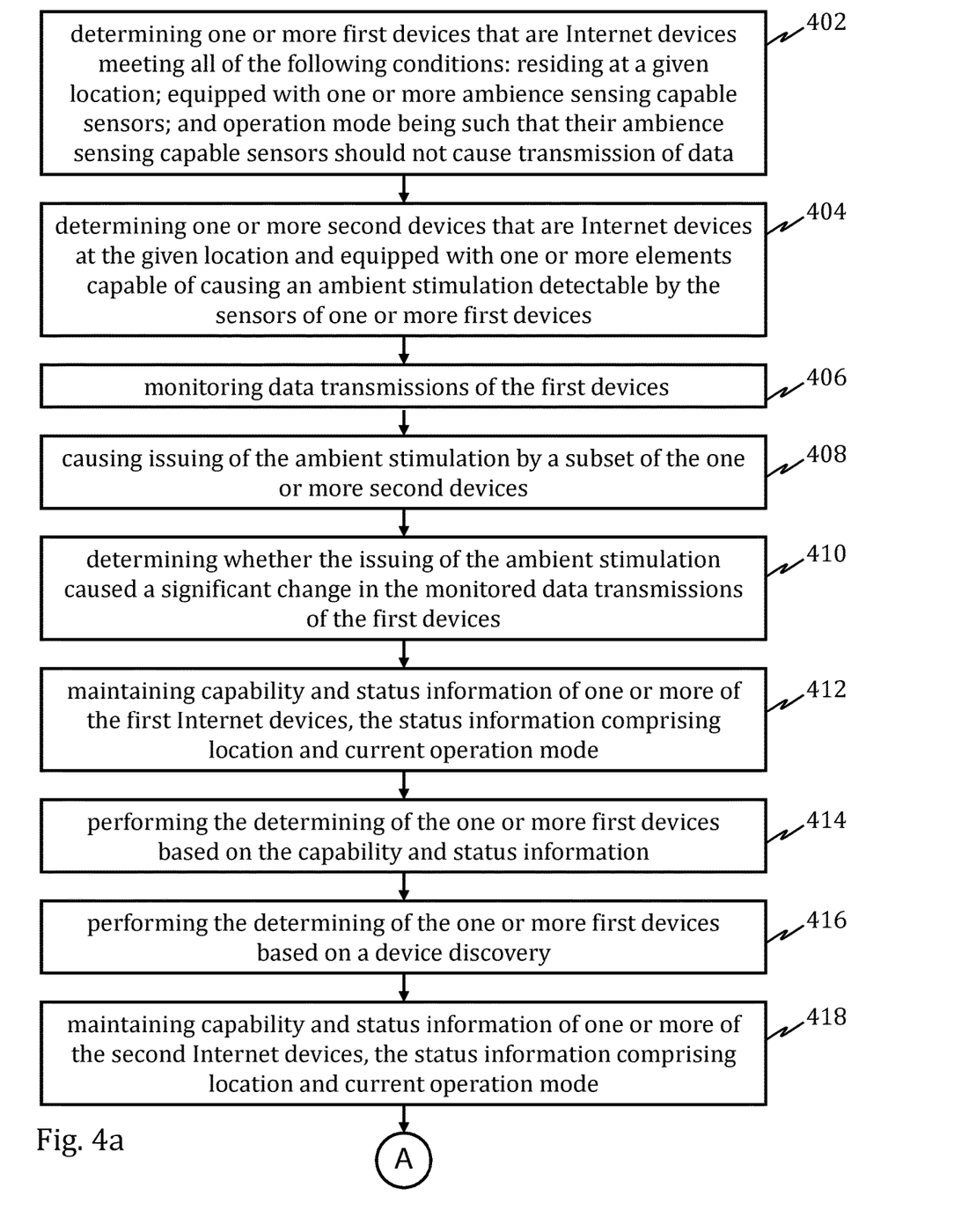
FIGS. 4a to 4d show a flow chart of a process of an example embodiment.
Figure 4B:
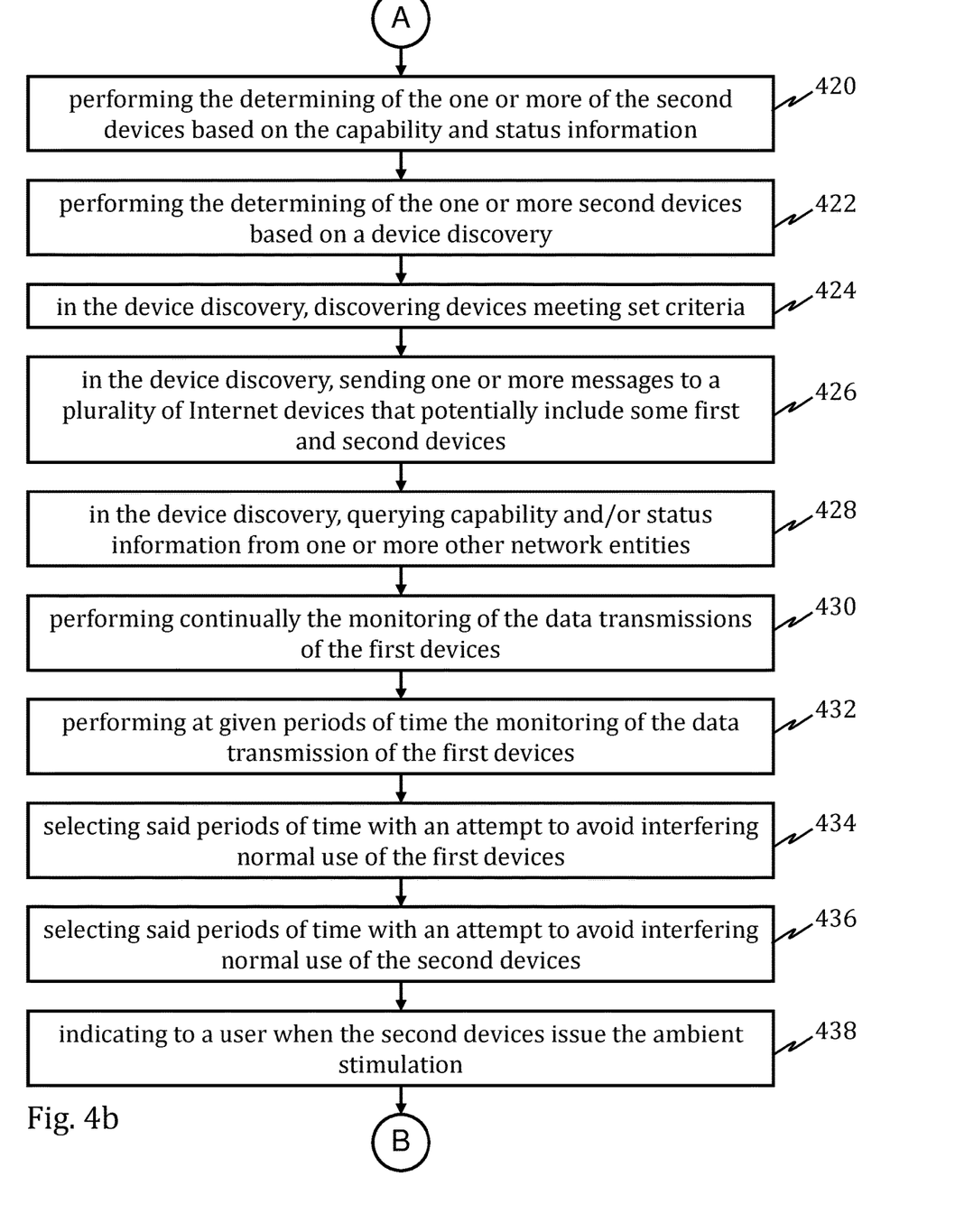
Figure 4C:
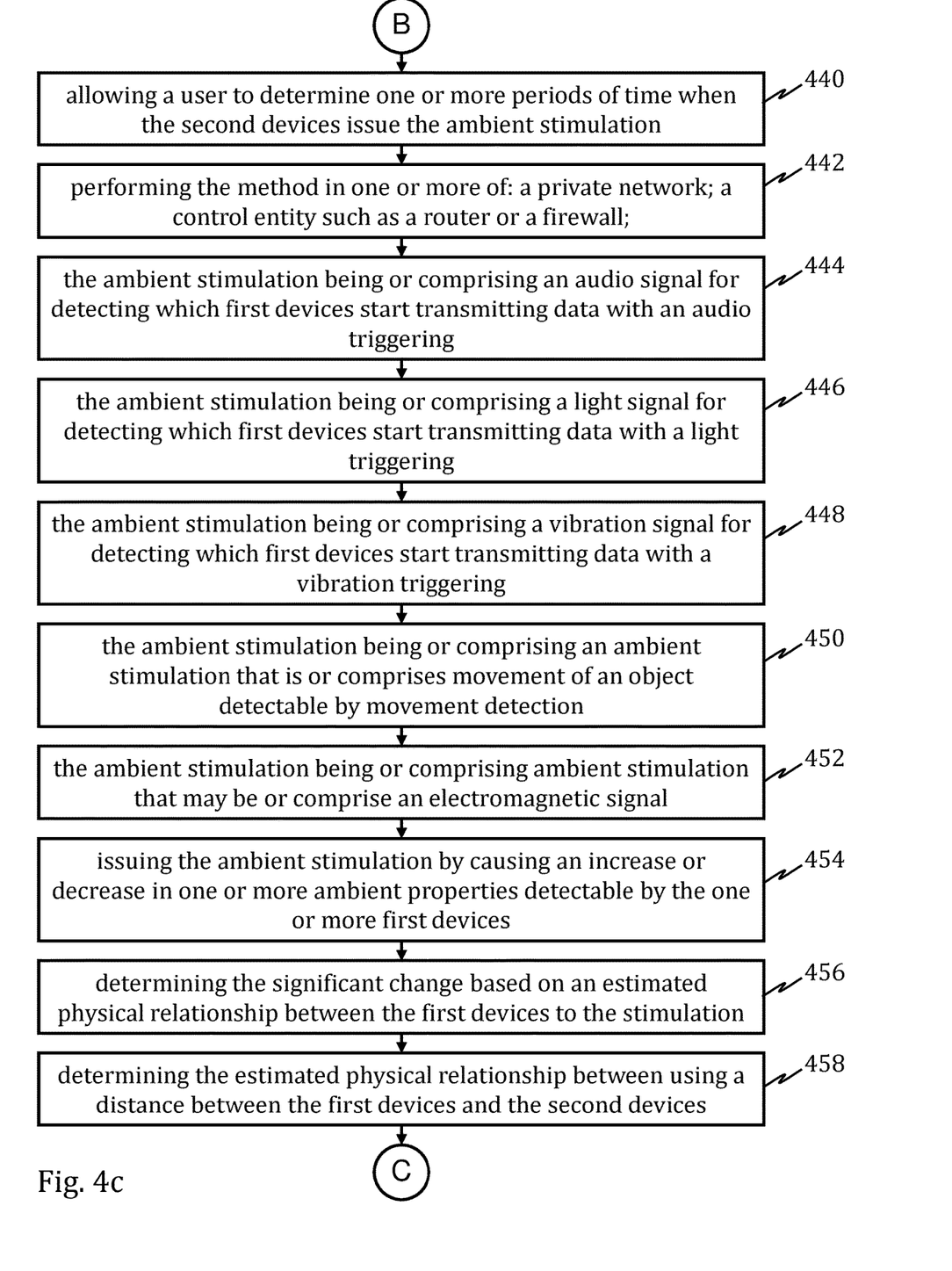
Figure 4D:
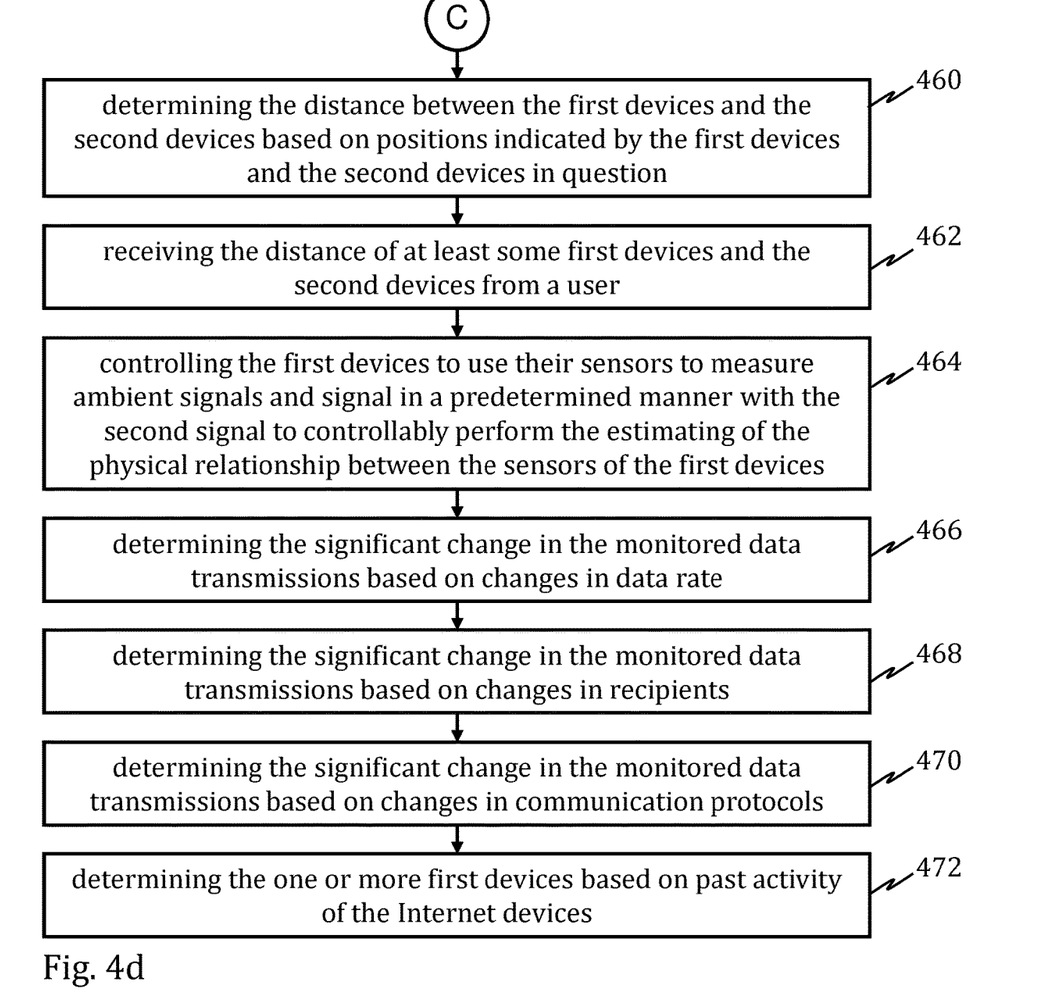

FIG. 3 shows a block diagram of a third device 120 according to an embodiment of the invention. The third device 120 comprises a user interface 330, a memory 340 including a persistent computer program code 350. The third device 120 further comprises a processor 320 for controlling the operation of the third device 120 using the computer program code 340 and a communication unit 310 for communicating with network data packets. The communication unit 310 comprises, for example, a local area network (LAN) port; a wireless local area network (WLAN) unit; Bluetooth unit; cellular data communication unit; or satellite data communication unit. The processor 320 comprises, for example, any one or more of: a master control unit (MCU); a microprocessor; a digital signal processor (DSP); an application specific integrated circuit (ASIC); a field programmable gate array; and a microcontroller.

In an example embodiment, the third device 120 further comprises a status detector 360 configured to detect expected communication status of one or more of the first devices 110 connected to the subnet 140. The status detector 360 comprises, for example, a circuitry configured to determine current operational status of the first devices 110 (such as on/off/idle). In an example embodiment, status detector enquires the current status from first devices 110 that are capable of providing their status in response to a query from the third device 120. In an example embodiment, the status detector 360 further or alternatively comprises a schedule that describes when the first devices 110 are expected to send data or when the first devices 110 are expected not to send data. It should be appreciated that the third device 120 need not operate in a same way with each of the first devices 110.

The third device 120 further comprises a location detector 370 configured to detect which first devices 110 and second devices 112 reside at a given location. The location detector 370 may comprise a user input 372 configured to receive the location of some or all of the first devices 110 and second devices 112 from a person; a robot 374 configured to move and detect locations of proximate first devices 110 and second devices 112; and a location query circuitry 376 configured to query the locations of the first devices 110 and second devices 112 from the respective first devices 110 and second devices themselves or from a location data repository.

FIGS. 4a to 4d illustrate a flow chart of a process of an example embodiment, showing:

402. determining one or more first devices 110 that are Internet devices meeting all of the following conditions: residing at a given location; equipped with one or more ambience sensing capable sensors 260; and operation mode being such that their ambience sensing capable sensors 260 should not cause transmission of data;

404. determining one or more second devices 112 that are Internet devices at the given location and equipped with one or more elements capable of causing an ambient stimulation detectable by the sensors of one or more first devices (e.g., by triggering a noisy or visually notable operation by one or more controllable other first devices 110);

406. monitoring data transmissions of the first devices 110;

408. causing issuing of the ambient stimulation by a subset (e.g., some or all) of the one or more second devices 112; and

410. determining whether the issuing of the ambient stimulation caused a significant change in the monitored data transmissions of the first devices.

In some embodiments, the process further comprises any one or more of the following:

412. maintaining capability and status information of one or more of the first Internet devices 110, the status information comprising location and current operation mode;

414. performing the determining of the one or more first devices 110 based on the capability and status information;

416. performing the determining of the one or more first devices 110 based on a device discovery;

418. maintaining capability and status information of one or more of the second Internet devices 112, the status information comprising location and current operation mode;

420. performing the determining of the one or more of the second devices 112 based on the capability and status information;

422 performing the determining of the one or more second devices 112 based on a device discovery;

424. in the device discovery, discovering devices meeting set criteria;

426. in the device discovery, sending one or more messages to a plurality of Internet devices that potentially include some first and second devices;

428. in the device discovery, querying capability and/or status information from one or more network entities, wherein he one or more network entities may be other than a network entity that performs the method of the first example aspect and/or the network entities may comprise one or more entities selected from a group consisting of: a server; a virtual server; a cloud computing function; a distributed server;

430. performing continually the monitoring of the data transmissions of the first devices;

432. performing at given periods of time the monitoring of the data transmission of the first devices, wherein said periods of time may be selected based on random timing; status of the first devices 110; status of the second devices 112;

434. selecting said periods of time with an attempt to avoid interfering normal use of the first devices;

436. selecting said periods of time with an attempt to avoid interfering normal use of the second devices;

438. indicating to a user when the second devices issue the ambient stimulation;

440. allowing a user to determine one or more periods of time when the second devices issue the ambient stimulation;

442. performing the method in one or more of: a private network; a control entity such as a router or a firewall;

444. the ambient stimulation being or comprising an audio signal for detecting which first devices 110 start transmitting data with an audio triggering, wherein the audio signal may comprise a portion of an audible frequency and/or a portion with a frequency in a non-audible frequency;

446. the ambient stimulation being or comprising a light signal for detecting which first devices 110 start transmitting data with a light triggering, wherein the light signal may comprise a portion of a visible frequency and/or a portion with a frequency in a non-visible frequency;

448. the ambient stimulation being or comprising a vibration signal for detecting which first devices 110 start transmitting data with a vibration triggering, wherein the vibration signal may be a haptic signal;

450. the ambient stimulation being or comprising an ambient stimulation that is or comprises movement of an object detectable by movement detection, e.g., ultrasound based sonar sensors; 3D camera sensors; LIDAR sensors;

452. The ambient stimulation being or comprising ambient stimulation that may be or comprise an electromagnetic signal, such as a radio communication signal;

wherein the ambient stimulation being detectable in an example embodiment by the first devices 110 at a given range of at least 1 m; 2 m; 5 m; 10 m; or 20 m;

454. Issuing the ambient stimulation by causing an increase or decrease in one or more ambient properties detectable by the one or more first devices 110, wherein the ambient stimulation may comprise a series of changes in one or more ambient properties detectable by the one or more first devices 110; the ambient stimulation may comprise a transmission with a combination of power and frequency distribution that is safe to human beings at a distance of at least 1 cm; 10 cm; or 1 m from each of the second devices 112; the ambient stimulation may comprise reducing one or more ambient properties detectable by the first devices 110; the ambient stimulation may comprise switching off a sound source; the ambient stimulation may comprise switching off a light source; and/or the ambient stimulation may comprise switching off a vibration source.

456. determining the significant change based on an estimated physical relationship between the first devices 110 to the stimulation;

458. determining the estimated physical relationship between using a distance between the first devices 110 and the second devices 112;

460. determining the distance between the first devices 110 and the second devices 112 may be determined based on positions indicated by the first devices 110 and the second devices 112 in question;

462. receiving the distance of at least some first devices 110 and the second devices 112 from a user;

464. controlling the first devices 110 to use their sensors 260 to measure ambient signals and signal in a predetermined manner with the second signal to controllably perform the estimating of the physical relationship between the sensors 260 of the first devices 110.

466. determining the significant change in the monitored data transmissions based on changes in data rate;

468. determining the significant change in the monitored data transmissions based on changes in recipients;

470. determining the significant change in the monitored data transmissions based on changes in communication protocols, such as transport protocols, streaming protocols and/or Quality of Service;

472. determining the one or more first devices 110 based on past activity of the Internet devices.

As mentioned in connection with step 448, the ambient stimulation may comprise a series of changes in one or more properties. Such a series can be formed, for example, by forming a sound and/or light signal comprising different periods of different frequencies and/or power. For example, a test stimulus may comprise turn a smart light A with 100% power and generating a given tone at 75% power from smart speaker B.

In an example embodiment, any one or more of steps 402 to 472 are performed or caused by the third device 120.

As used in this application, the term "circuitry" may refer to one or more or all of the following:

(a) hardware-only circuit implementations (such as implementations in only analog and/or digital circuitry) and;

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Without in any way limiting the scope, interpretation, or application of the claims appearing below, a technical effect of one or more of the example embodiments disclosed herein is that undesired monitoring of local premises can be detected from network traffic and knowledge of ambient stimulation. Another technical effect of one or more of the example embodiments disclosed herein is that the undesired monitoring may be detected even from encrypted communications. Yet another technical effect of one or more of the example embodiments disclosed herein is that the undesired monitoring may be detected without disturbing persons in or near the premises when using stimulation not perceivable to a human being, such as infrared or ultraviolet light and/or infra sound or ultrasound audio. Yet another technical effect of one or more of the example embodiments disclosed herein is that the undesired monitoring may be detected without need for new or additional equipment by using existing network controllable equipment to cause the ambient stimulus.

Embodiments of the present invention may be implemented in software, hardware, application logic or a combination of software, hardware and application logic. The software, application logic and/or hardware may reside on the first network device 110, the second network device 112 or the third network device 120. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code for one or more programs, the at least one memory and the computer program code configured to, with the at least one processor, cause the apparatus to perform at least the following:

determine one or more first devices that are Internet devices meeting the following conditions: residing at a given location; equipped with one or more ambience sensing capable sensors; and operation mode being such that their ambience sensing capable sensors should not cause transmission of data;

determine one or more second devices that are Internet devices at the given location and equipped with one or more elements capable of causing an ambient stimulation detectable by the sensors of one or more first devices;

monitor data transmissions of the first devices;

cause issuing of the ambient stimulation by a subset of the one or more second devices; and determine whether the issuing of the ambient stimulation caused a change in the monitored data transmissions of the first devices.

2. The apparatus of claim 1, wherein the apparatus is further caused to perform:
maintain capability and status information of one or more of the first Internet devices, the status information comprising location and current operation mode; and
perform the determining of the one or more first devices based on the capability and status information.

3. The apparatus of claim 1, wherein the apparatus is further caused to perform:
maintain capability and status information of one or more of the second Internet devices, the status information comprising location and current operation mode; and
perform the determining of the one or more second devices based on the capability and status information.

4. The apparatus of claim 1, wherein the monitoring of the data transmissions of the first devices is performed continually.

5. The apparatus of claim 1, wherein the monitoring of the data transmission of the first devices is performed at given periods of time.

6. The apparatus of claim 1, wherein the ambient stimulation comprises an audio signal.

7. The apparatus of claim 6, wherein the audio signal comprises a portion with a frequency in a non-audible frequency.

8. The apparatus of claim 1, wherein the ambient stimulation comprises a light signal.

9. The apparatus of claim 8, wherein the light signal comprises a portion with a frequency in a non-visible frequency.

10. The apparatus of claim 1, wherein the ambient stimulation comprises a vibration signal.

11. The apparatus of claim 1, wherein the ambient stimulation comprises movement of an object detectable by movement detection.

12. The apparatus of claim 1, wherein the ambient stimulation comprises an electromagnetic signal.

13. The apparatus of claim 1, wherein the ambient stimulation comprises a series of changes in the ambient properties.

14. The apparatus of claim 1, wherein the determining of the one or more first devices is based on past activity of the Internet devices.

15. A method comprising:
determining one or more first devices that are Internet devices meeting all of the following conditions: residing at a given location; equipped with one or more ambience sensing capable sensors; and operation mode being such that their ambience sensing capable sensors should not cause transmission of data;
determining one or more second devices that are Internet devices at the given location and equipped with one or more elements capable of causing an ambient stimulation detectable by the sensors of one or more first devices;
monitoring data transmissions of the first devices using the communication interface;
causing issuing of the ambient stimulation by a subset of the one or more second devices, using the communication interface; and
determining whether the issuing of the ambient stimulation caused a significant change in the monitored data transmissions of the first devices.

16. The method of claim 15, further comprising:
maintaining capability and status information of one or more of the first Internet devices, the status information comprising location and current operation mode; and
performing the determining of the one or more first devices based on the capability and status information.

17. The method of claim 15, further comprising:
maintaining capability and status information of one or more of the second Internet devices, the status information comprising location and current operation mode; and
performing the determining of the one or more second devices based on the capability and status information.

18. The method of claim 15, wherein the monitoring of the data transmissions of the first devices is performed continually.

19. The method of claim 15, wherein the monitoring of the data transmission of the first devices is performed at given periods of time.

20. The method of claim 15, wherein the ambient stimulation comprises an audio signal.

* * * * *